US012752504B2

(12) United States Patent
Hu et al.

(10) Patent No.: US 12,752,504 B2
(45) Date of Patent: Oct. 6, 2026

(54) MANUFACTURING METHOD OF THERMOPLASTIC COMPOSITE BICYCLE FRAME

(71) Applicant: ASTRO TECH CO., LTD., Changhua City (TW)

(72) Inventors: Samuel Hu, Changhua City (TW); Liu-Cheng Liu, Changhua City (TW); Yan-Hsun Chen, Changhua City (TW)

(73) Assignee: ASTRO TECH CO., LTD., Changhua City (TW)

( * ) Notice: Subject to any disclaimer, the term of this patent is extended or adjusted under 35 U.S.C. 154(b) by 368 days.

(21) Appl. No.: 18/360,226

(22) Filed: Jul. 27, 2023

(65) Prior Publication Data

US 2023/0373175 A1 Nov. 23, 2023

Related U.S. Application Data

(63) Continuation-in-part of application No. 17/333,774, filed on May 28, 2021, now Pat. No. 12,151,773, (Continued)

(51) Int. Cl.
*B29D 12/00* (2006.01)
*B29K 101/12* (2006.01)

(Continued)

(52) U.S. Cl.
CPC .......... *B29D 12/00* (2013.01); *B29K 2101/12* (2013.01); *B29K 2309/08* (2013.01); *B62K 3/02* (2013.01)

(58) Field of Classification Search
CPC ................................ B29D 12/00; B62K 19/16

(Continued)

(56) References Cited

U.S. PATENT DOCUMENTS 4,145,068 A * 3/1979 Toyomasu ............. B62K 19/18 280/281.1
4,548,422 A * 10/1985 Michel .................. B62K 19/16 180/219

(Continued)

FOREIGN PATENT DOCUMENTS

CN 102303672 A * 1/2012
CN 115701385 2/2023

(Continued)

OTHER PUBLICATIONS

EPO. "Written Opinion of Application 19186923.9". 2020. EPO. Espacenet. (Year: 2020).*

(Continued)

*Primary Examiner* — Susan D Leong
*Assistant Examiner* — Jonathan B Woo
(74) *Attorney, Agent, or Firm* — Best & Flanagan LLP

(57) ABSTRACT

A manufacturing method of a thermoplastic composite bicycle frame comprises a shell forming step: turning thermoplastic composite laminates into shells being assemblable by compression molding, wherein each shell has a cavity surrounded by the shell, at least one straight segment and at least one curved segment connected with each other, the straight segments are aligned with one another, the curved segments are aligned with one another, each straight segment has a straight connecting edge, and each curved segment has a curved connecting edge; a shell assembling step: assembling the shells to make the straight connecting edges overlapped with one another and to make the curved connecting edges butt jointed with one another; and a hot pressing step: turning the straight connecting edges and the curved connecting edges into fusion areas by heating and compressing so as to connect the shells as a bicycle frame component.

10 Claims, 20 Drawing Sheets

Related U.S. Application Data which is a continuation-in-part of application No. PCT/CN2018/122595, filed on Dec. 21, 2018.

(51) Int. Cl.
*B29K 309/08* (2006.01)
*B62K 3/02* (2006.01)

(58) Field of Classification Search
USPC ................................ 264/46.6, 250, 257, 258
See application file for complete search history.

(56) References Cited

U.S. PATENT DOCUMENTS

| | | | | | |
|---|---|---|---|---|---|
| 4,889,355 | A * | 12/1989 | Trimble | B62K 19/16 280/281.1 |
| 5,464,240 | A * | 11/1995 | Robinson | B62K 19/16 280/281.1 |
| 6,340,509 | B1 * | 1/2002 | Nelson | B62K 19/16 280/281.1 |
| 2014/0191492 | A1 | 7/2014 | Al-Sheyyab et al. | |
| 2023/0219649 | A1 * | 7/2023 | Verhuizen | B62K 19/16 280/281.1 |
| 2024/0417022 | A1 * | 12/2024 | Hu | B62K 19/10 |

FOREIGN PATENT DOCUMENTS

| | | | | |
|---|---|---|---|---|
| EP | 3670158 | | 12/2022 | |
| EP | 4146531 | | 3/2023 | |
| FR | 2736031 | A1 * | 1/1997 | B62K 19/28 |
| JP | H11192990 | | 7/1999 | |
| TW | 201416287 | A * | 5/2014 | |
| TW | 202023799 | | 7/2020 | |
| TW | I772187 | | 7/2022 | |
| TW | 202306819 | | 2/2023 | |
| WO | WO-2015185192 | A1 * | 12/2015 | B29C 65/1635 |

OTHER PUBLICATIONS

Lin, Y. “English Machine Translation of TW 201416287 A”. 2025. EPO. Espacenet. (Year: 2025).*

Oelschlegel, A. “English machine translation of WO-2015185192-A1”. EPO. Espacenet. (Year: 2026).*

Humbert, P. “English machine translation of FR-2736031-A1”. EPO. Espacenet. (Year: 2026).*

Zhang, G. “English machine translation of CN-102303672-A”. EPO. Espacenet. (Year: 2026).*

* cited by examiner

MANUFACTURING METHOD OF THERMOPLASTIC COMPOSITE BICYCLE FRAME

CROSS-REFERENCE TO RELATED APPLICATIONS

This application is a continuation-in-part of U.S. patent application Ser. No. 17/333,774 filed on May 28, 2020, which is a continuation-in-part of international Application No. PCT/CN2018/122595 filed on Dec. 21, 2018. The entire disclosure of the above applications are incorporated herein by reference.

BACKGROUND OF THE INVENTION

1. Field of the Invention

The present invention relates to a forming technique for a bicycle frame component, and more particularly to a manufacturing method of a thermoplastic composite bicycle frame via applying compression molding to thermoplastic composite materials.

2. Description of Related Art

Aiming to higher mass production capability, a conventional manufacturing method of a thermoplastic composite bicycle frame utilizes compression molding to combine multiple shells.

However, the conventional manufacturing method of a thermoplastic composite bicycle frame separates a bicycle frame into several bicycle frame units at curved parts in order to solve stress concentration. The several bicycle frame units are produced respectively and connected with a bicycle frame component afterwards. In this way, the operational steps are complicated, and a substantially complete bicycle frame component cannot be made directly.

SUMMARY OF THE INVENTION

The main objective of the present invention is to provide a manufacturing method of a thermoplastic composite bicycle frame which improves on the disadvantages of the conventional manufacturing method with a simplified and direct process.

The manufacturing method of a thermoplastic composite bicycle frame comprises a shell forming step: turning thermoplastic composite laminates into multiple separate shells by compression molding, wherein the multiple shells are capable of being assembled together, each one of the multiple shells has a cavity surrounded by the shell, at least one straight segment and at least one curved segment connected with the at least one straight segment, the straight segments of the multiple shells are aligned with one another and configured to be assembled to one another as frame tubes of a bicycle frame component which are substantially straight, the curved segments of the multiple shells are aligned with one another and configured to be assembled to one another as a connecting part of the frame tubes, each straight segment has a straight connecting edge, and each curved segment has a curved connecting edge; a shell assembling step: assembling the multiple shells to make the straight connecting edges of the multiple shells overlapped with one another and to make the curved connecting edges of the multiple shells butt jointed with one another rather than being overlapped; and a hot pressing step: through compression molding, turning the overlapped straight connecting edges and the butt jointed curved connecting edges of the multiple shells into multiple fusion areas by heating and compressing so as to connect the multiple shells as the bicycle frame component. In the shell forming step, forming a transitional segment between adjacent said straight connecting edge and said curved connecting edge on each one of the multiple shells. In the shell assembling step, assembling the multiple shells to make said transitional segment of each one of the multiple shells partially abutted with and partially mislaid as non-overlapping and non-abutting with said transitional segment of another said shell, thereby dividing the transitional segment into an abutted part and a mislaid part, and the abutted part and the mislaid part of each said transitional segment are arranged along an extending direction of the corresponding straight segments.

Other objectives, advantages and novel features of the invention will become more apparent from the following detailed description when taken in conjunction with the accompanying drawings.

DETAILED DESCRIPTION OF THE PREFERRED EMBODIMENT

A method for forming a bicycle frame component 20 made of thermoplastic composite laminates 10 has a shell forming step, an overlapping step, a hot compressing connection step, and a supporting unit removal step. With reference to FIGS. 1 to 5, a first embodiment is illustrated for manufacturing a bicycle frame component 20.

Figure 1:
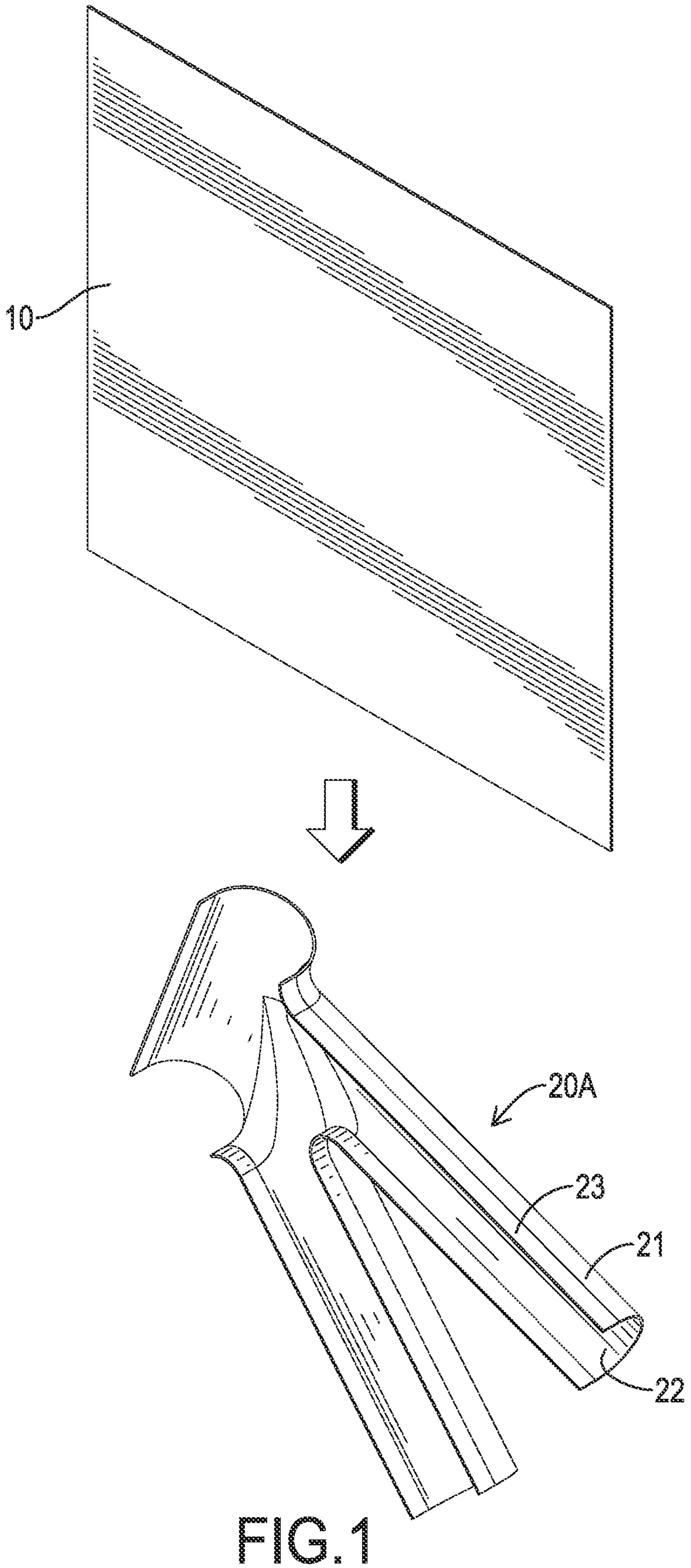
FIG. 1 shows perspective views of a first embodiment of a shell of a bicycle frame component in accordance with the present invention showing a thermoplastic composite laminate turned into the shell.
Figure 5:
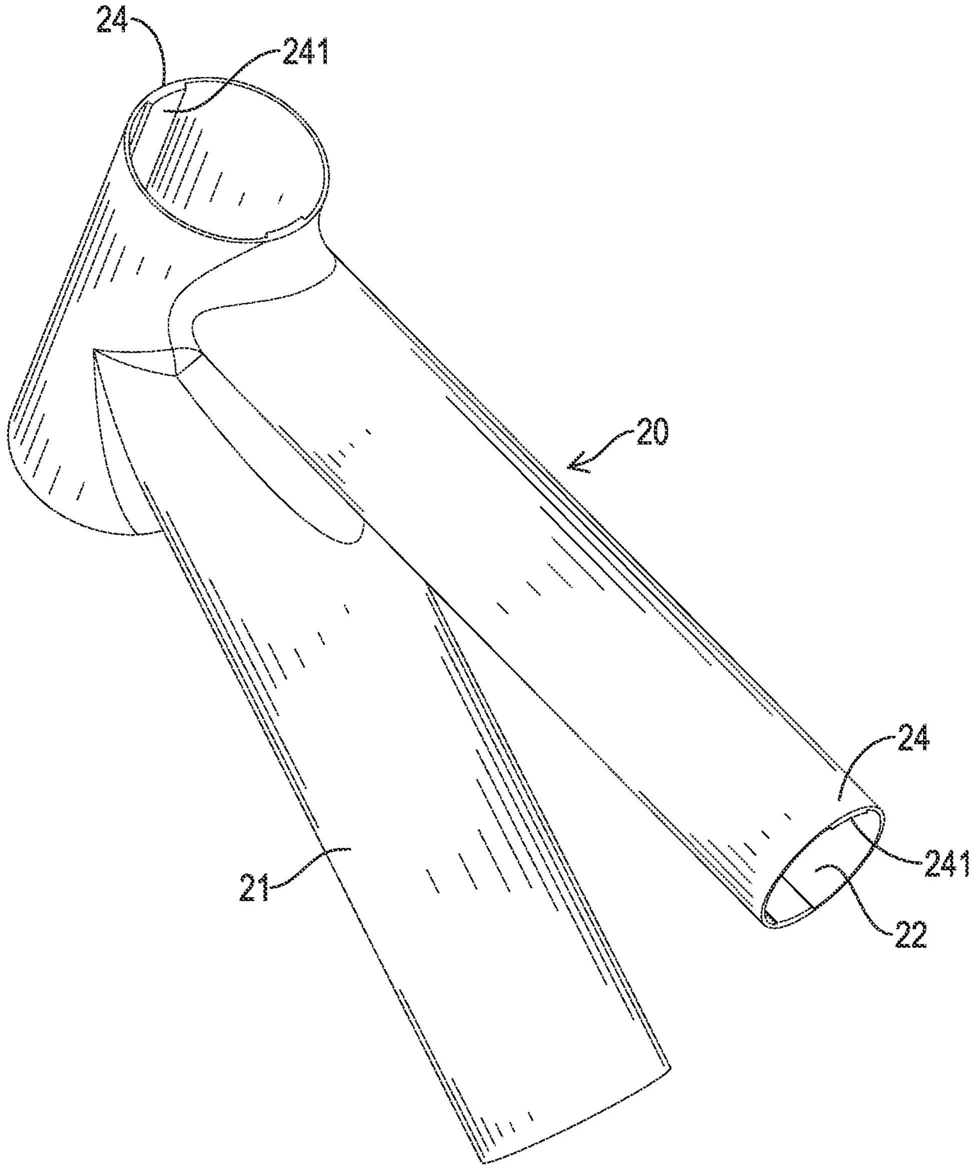
FIG. 5 is a perspective view of the first embodiment of the bicycle frame component in FIG. 1.

With reference to FIGS. 1 and 5, the bicycle frame component 20 is composed of two shells 20A, 20B that are capable of being symmetrically assembled together. In the shell forming step, two thermoplastic composite laminates are turned into the two shells 20A, 20B by compression molding. Each one of the two composite laminates may be carbon fiber reinforced thermoplastic composite laminates or glass fiber reinforced thermoplastic composite laminates. In the shell forming step, each one of the two shells 20A, 20B may be manufactured by a complete thermoplastic composite laminate. Alternatively, the complete thermoplastic composite laminate may be cut according to the outline of molds for compression molding. After molding, the two shells 20A, 20B are trimmed to finish the two shells 20A, 20B.

Multiple layers of prepregs composed of a polymer matrix and multiple fibers are trimmed, are stacked up or placed in sequence, and then are compressed with heat and pressure. When the temperature of the polymer matrix rises above the glass transition temperature (Tg) of the polymer matrix, molecules of polymer matrix of each two layers of prepregs diffuse to connect the two layers of prepregs without applying additional adhesive. In the present invention, the polymer matrix is thermoplastic matrix, and the reinforcements of the prepregs may be implemented as carbon fibers, glass fibers, etc. The reinforcements of the prepregs may be woven fabrics or unidirectional fabrics. The numbers of layers of the prepregs and the orientation of each layer of the prepregs are decided according to thickness or function of product. In the shell forming step, the glass transition temperature (Tg) of the polymer matrix, which is the thermoplastic matrix, is about 150° C. to 190° C., the heating temperature of molds for compressing is about 220° C. to 300° C., and the pressurizing pressure is less than and equal to 1 MPa.

Figure 2:
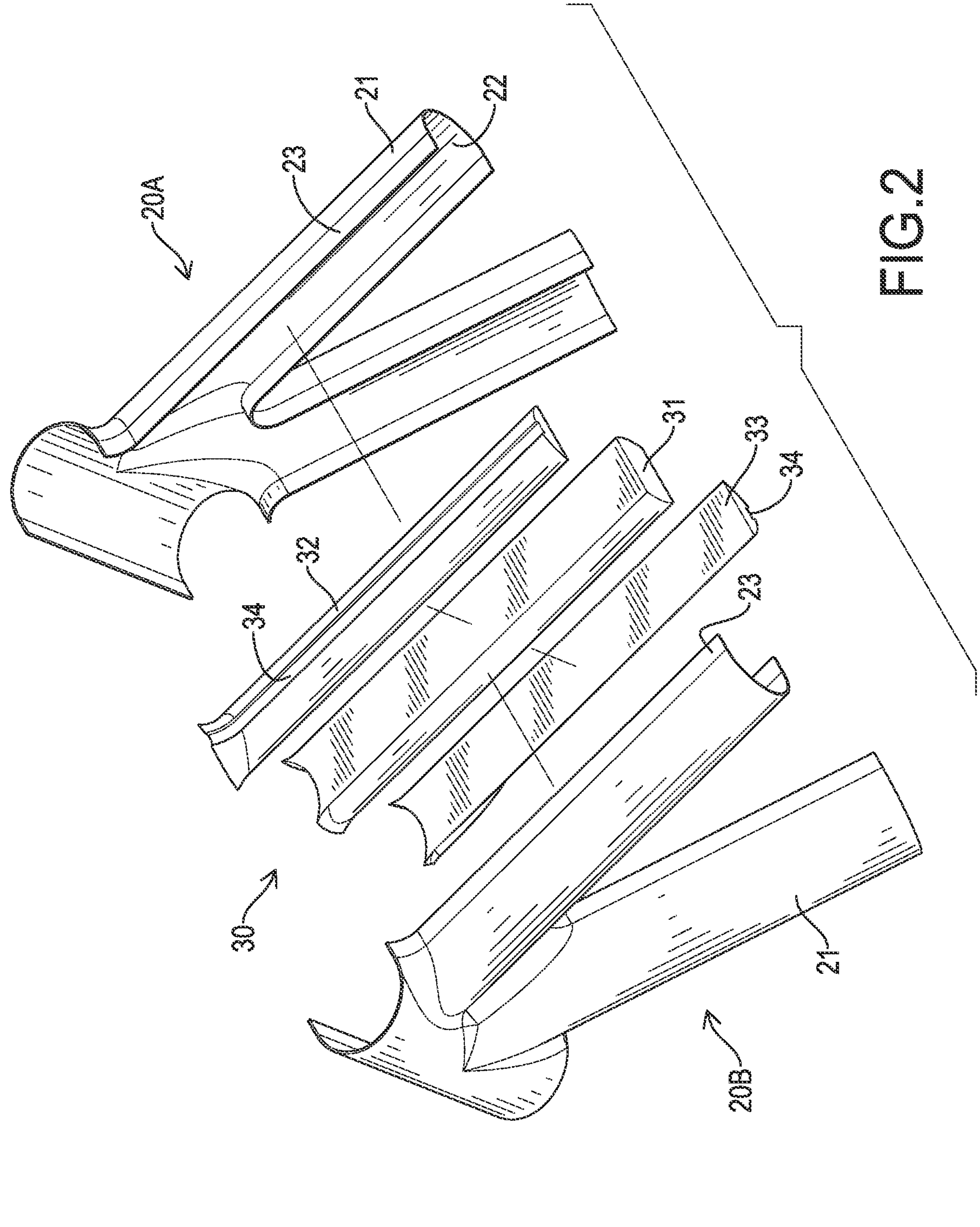
FIG. 2 is an exploded perspective view of two shells in FIG. 1 and a supporting unit for supporting the two shells.

With reference to FIG. 2, each one of the two shells 20A, 20B has an exterior surface 21, a cavity 22 surrounded by the shell 20A, 20B, and multiple connecting margins 23. Each one of the multiple connecting margins 23 is configured to be connected to one corresponding connecting margin 23 of the other one of the two shells 20A, 20B. In the first embodiment, in order to make the two corresponding connecting margins 23 overlap, each one of the multiple connecting margins 23 has a width that is about 2.5 to 6 mm from the symmetric line of the bicycle frame component 20. Therefore, when the two corresponding connecting margins 23 of the two shells 20A, 20B are overlapped, an overlapping section of the two shells 20A, 20B has a width that is about 5 to 12 mm. In the present invention, the number of the shells of the bicycle frame component 20 may be three or more. The shells are capable of being symmetrically assembled together, and the number of the shells is not limited in the present invention.

Figure 3:
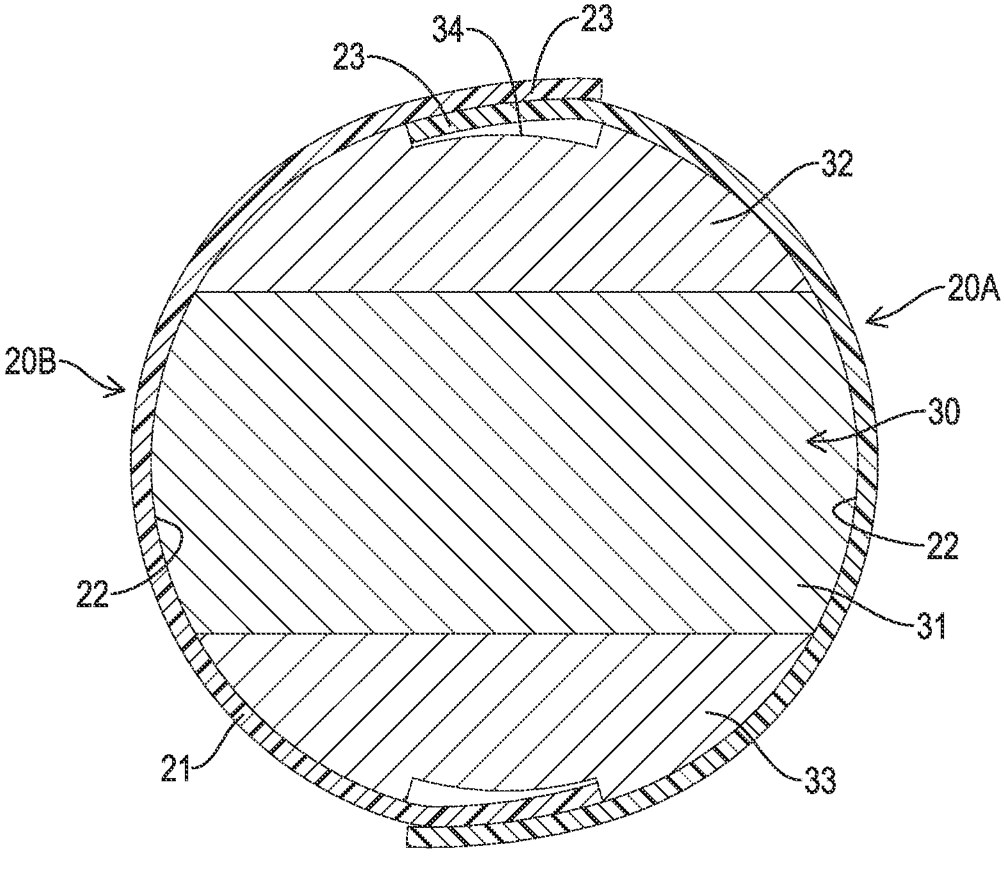
FIG. 3 is an enlarged cross sectional side view of the two shells and the supporting unit in FIG. 2.

In the overlapping step: with reference to FIGS. 2 and 3, the two shells 20A, 20B are symmetrically assembled with each other, and the two corresponding connecting margins 23 of the two shells 20A, 20B are overlapped. In the first embodiment, the two shells 20A, 20B have two overlapping sections, and the width of the overlapping sections of the two shells 20A, 20B is about 8 mm. In order to provide the two shells 20A, 20B with sufficient support during the subsequent compressing connection step, a supporting unit 30 is deployed within the two shells 20A, 20B in the overlapping step. The supporting unit 30 may be made of metal, foam, wax, or even an air bag for molding, etc. The form of the supporting unit 30 is not limited in the present invention. With reference to FIG. 2, the supporting unit 30 is made of metal and is composed of a middle supporting member 31, an upper supporting member 32, and a lower supporting member 33. The supporting unit 30 has two receiving recesses 34 corresponding to the two overlapping sections of the two shells 20A, 20B in number and position. In the first embodiment of the present invention, the two receiving recesses 34 are respectively defined in the upper supporting member 32 and the lower supporting member 33.

Figure 4:
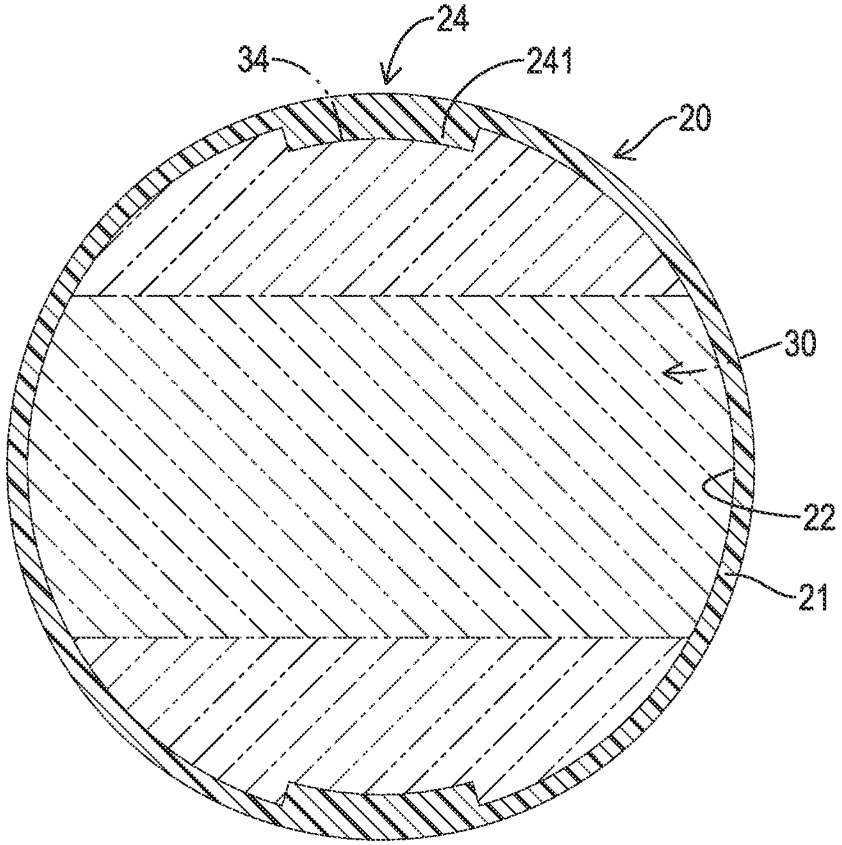
FIG. 4 is an enlarged cross sectional side view of the two shells and the supporting unit in FIG. 2 showing the two shells fused together after heating and compressing.

In the hot compressing connection step: with reference to FIGS. 3 and 4, the two shells 20A, 20B are heated and compressed by compression molding to diffuse molecules of the polymers of the two shells 20A, 20B to turn the two overlapping sections into two fusion areas 24, and to connect the two shells 20A, 20B to form the bicycle frame component 20. In the present invention, the two shells 20A, 20B are enclosed in molds, are heated, and are compressed to diffuse molecules of the polymers of the two shells 20A, 20B. The two shells 20A, 20B are connected without applying additional adhesive and are provided with sufficient connection.

In the hot compressing connection step, the glass transition temperature (Tg) of the polymer matrix, which is the thermoplastic matrix, is about 150° C. to 190° C., the heating temperature of molds for compressing is about 240° C. to 300° C., and the pressurizing pressure is about 9 MPa to 25 MPa. After heating and compressing for 2 to 5 minutes, the pressure of the molds is maintained between 9 MPa and 25 MPa, and the molds are cooled down to less than and equal to 100° C. Then the bicycle frame component 20 is removed from the molds. In the first embodiment, each one of the two overlapping sections formed by the two corresponding connecting margins 23 of the two shells 20A, 20B is fused to flow into a corresponding one of the two receiving recesses 34, and is turned into a fused protrusion 241. The fused protrusion 241 of each one of the two fusion areas 24 has a thickness larger than a thickness of each one of the two shells 20A, 20B. The fused protrusions 241 of each one of the two fusion areas 24 with larger thickness enhance the rigidity of the fusion area 24 of the bicycle frame component 20.

In the supporting unit removal step: with reference to FIGS. 4 and 5, after accomplishing the hot compressing connection step, the supporting unit 30 disposed within the bicycle frame component 20 is removed. In the first embodiment, the middle supporting member 31 is removed at first, and then the upper supporting member 32 and the lower supporting member 33 are removed in sequence. Then, the bicycle frame component 20 is trimmed to finish the bicycle frame component 20.

The method for forming the bicycle frame component 20 made of thermoplastic composite turns the thermoplastic composite laminates 10 into the two shells 20A, 20B by compression molding at first. Then, heat and compress the two shells 20A, 20B to fuse and to connect the two shells 20A, 20B. At last, the two shells 20A, 20B are connected and turned into the complete bicycle frame component 20. With the method in accordance with the present invention, the entire manufacturing process is quick and only takes about 5 minutes for molding. The conventional method for manufacturing bicycle frame components made of thermosetting composite takes 50 to 60 minutes for molding. Compared to the conventional method, the method in accordance with the present invention speeds up molding 10 times, saves labor, is suitable for mass production, and has profound industrial utility.

With reference to FIGS. 2 and 5, the bicycle frame component 20 has the two shells 20A, 20B. The two shells 20A, 20B are made of thermoplastic composite by compression molding. The two shells 20A, 20B are symmetrically connected to each other. Each one of the two overlapping sections is fused and turns into one of two fusion areas 24. The method in accordance with the present invention turns the thermoplastic composite into the two shells 20A, 20B. Then, heat and compress the two shells 20A, 20B and connect the two shells 20A, 20B accordingly. The method in accordance with the present invention stabilizes the quality of the bicycle frame component 20 and makes the bicycle frame component 20 have merits of lightweight and rigid structure. Since the thermoplastic composite can be repeatedly melted by heating and repeatedly hardened by cooling, the bicycle frame component 20 manufactured by the method in accordance with the present invention can be repaired and is recyclable and reusable. The bicycle frame component 20 manufactured by the method in accordance with the present invention is ecofriendly.

Figure 6:
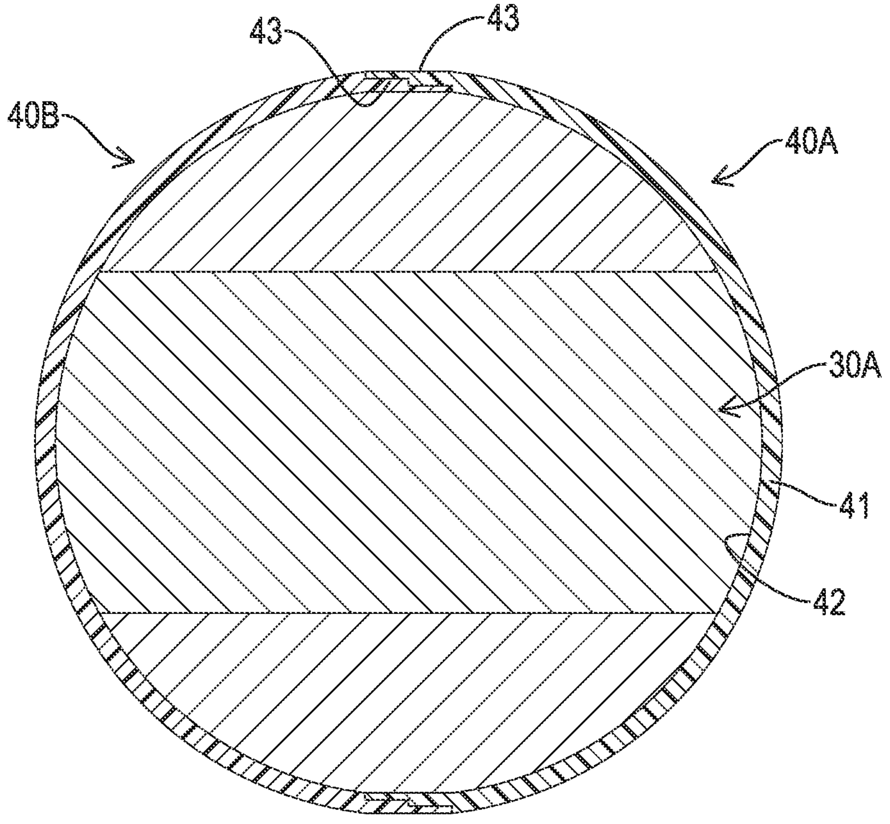
FIG. 6 is a cross sectional side view of a second embodiment of two shells and a supporting unit of a bicycle frame component in accordance with the present invention.

With reference to FIG. 6, in a second embodiment, the bicycle frame component has the two shells 40A, 40B. Each one of the two shells 40A, 40B has the exterior surface 41, the cavity 42, and two connecting margins 43. Each one of the two connecting margins 43 has a stepped structure. The two stepped structures of the two connecting margins 43 of one of the two shells 40A/40B structurally correspond to the two stepped structures of the two connecting margins 43 of the other one of the two shells 40B/40A. The two stepped structures of the two connecting margins 43 of one of the two shells 40A/40B respectively overlap the two stepped structures of the two connecting margins 43 of the other one of the two shells 40B/40A. In the second embodiment, the two receiving recesses of the supporting unit 30 are omitted. Each two corresponding connecting margins 43 of the multiple connecting margins 43 of the two shells 40A, 40B are heated, are compressed, and are fused together.

Figure 7:
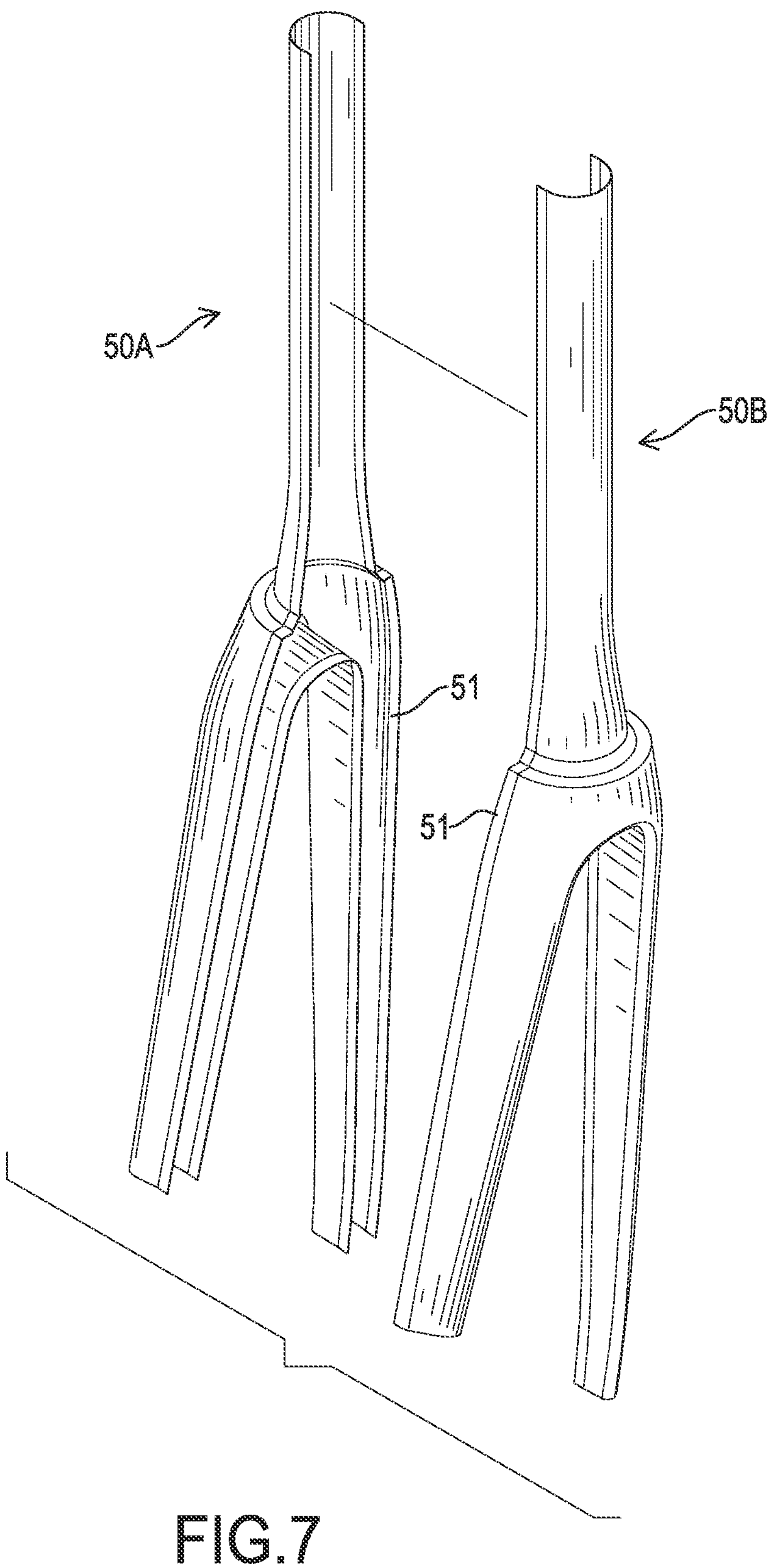
FIG. 7 is an exploded perspective view of a third embodiment of two shells in accordance with the present invention.
Figure 8:
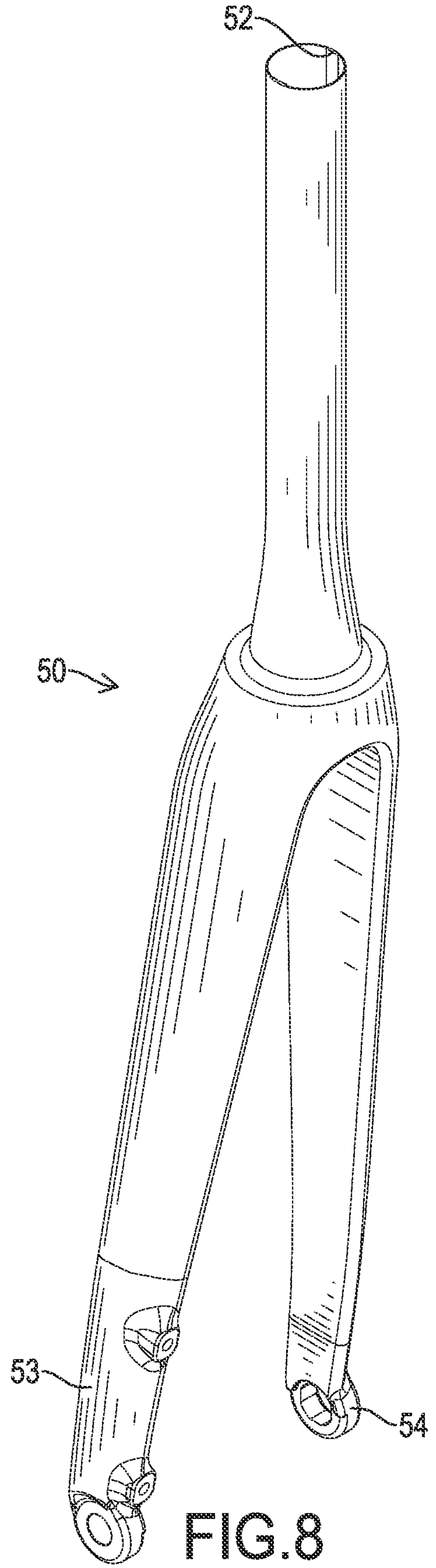
FIG. 8 is a perspective view of the bicycle frame component composed by the two shells in FIG. 7 showing the bicycle frame component connected with two dropouts.

With reference to FIGS. 7 and 8, a third embodiment in accordance with the present invention shows manufacturing of a front fork of a bicycle. The bicycle frame component 50 is the front fork of the bicycle and is separated into two shells 50A, 50B capable of being symmetrically assembled together. The two shells 50A, 50B are oppositely separated toward the front side and the rear side in FIG. 7. Each one of the two shells 50A, 50B also has two connecting margins 51 for symmetrically assembling the two shells 50A, 50B. Each two corresponding connecting margins 51 of the two shells 50A, 50B are heated, are compressed, and are fused together to turn into a fusion area 52. The bicycle frame component 50 is assembled with two dropouts 53, 54 to complete the front fork of the bicycle shown in FIG. 8.

Figure 9:
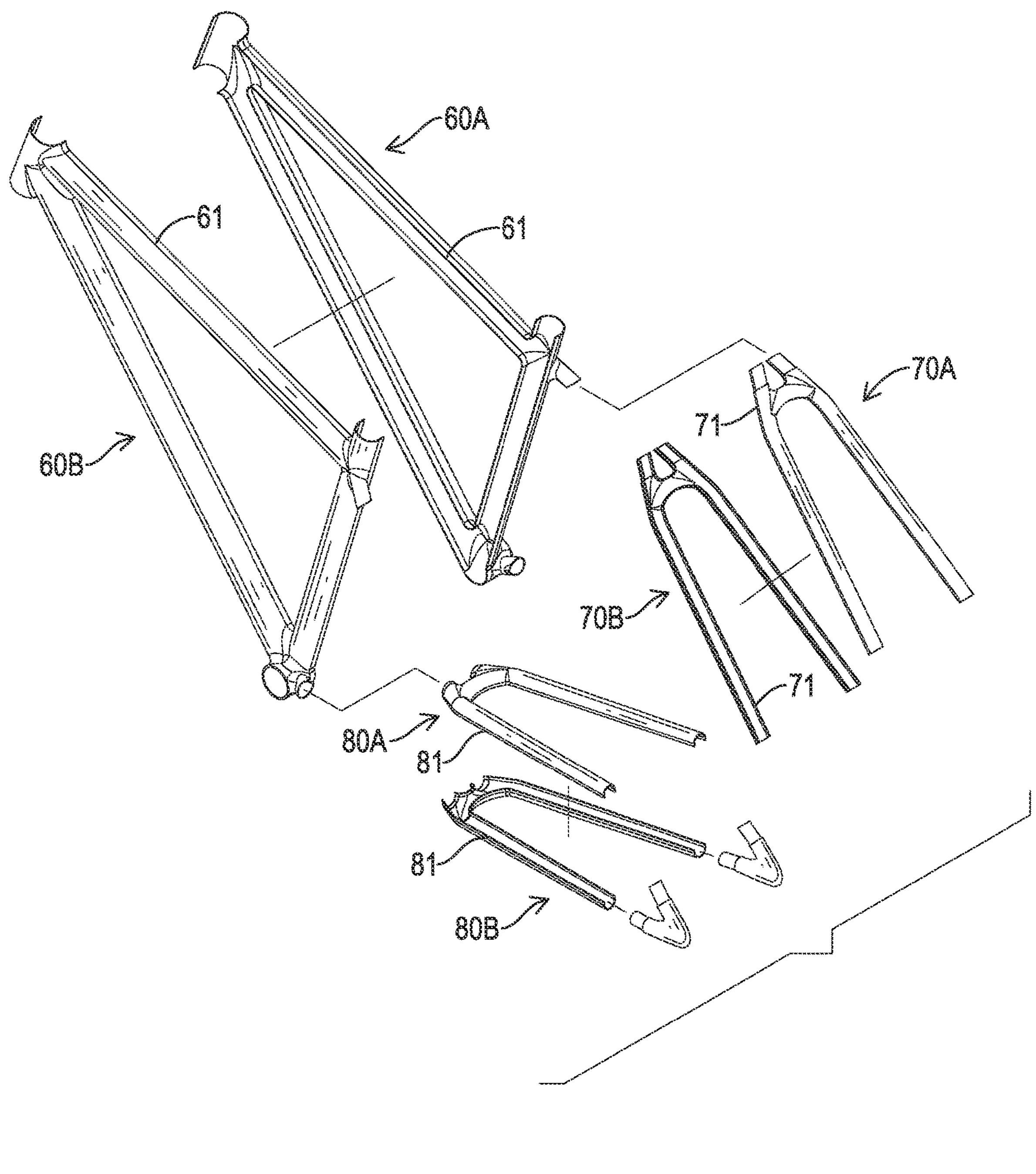
FIG. 9 is an exploded perspective view of a fourth embodiment of a bicycle frame in accordance with the present invention showing the bicycle frame is composed by multiple shells.
Figure 10:
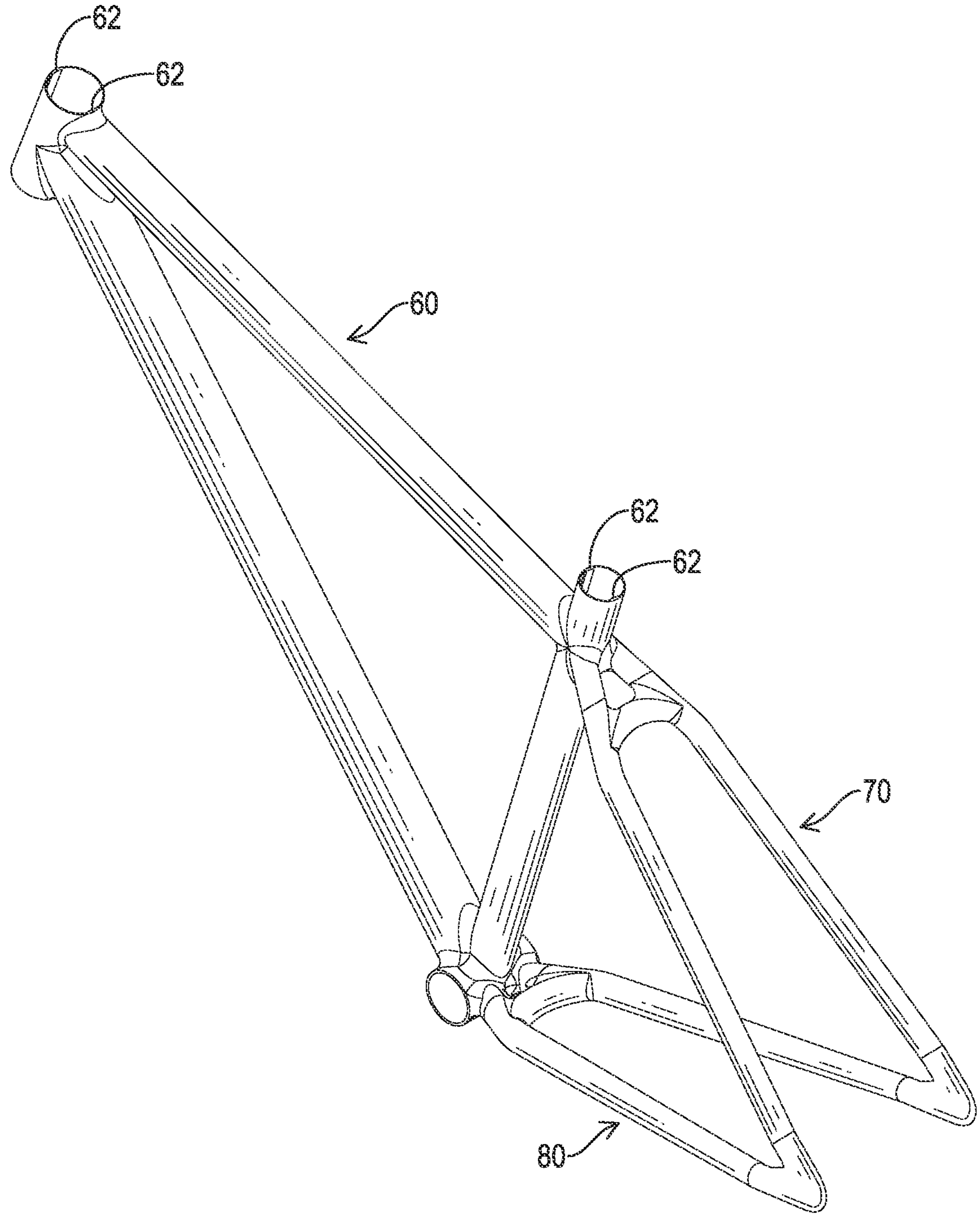
FIG. 10 is a perspective view of the bicycle frame in FIG. 9.

With reference to FIGS. 9 and 10, a fourth embodiment in accordance with the present invention shows manufacturing of an entire bicycle frame. The bicycle frame is composed of a first bicycle frame component 60, a second bicycle frame component 70, and a third bicycle frame component 80. The first bicycle frame component 60 is a main triangular portion of the bicycle frame and is oppositely separated into two first shells 60A, 60B toward the left side and the right side in FIG. 9. And the two first shells 60A, 60B are capable of being symmetrically assembled together. The second bicycle frame component 70 is a seat stay of the bicycle frame and is oppositely separated into two second shells 70A, 70B toward the upper side and the lower side in FIG. 9. The two second shells 70A, 70B are also capable of being symmetrically assembled together. The third bicycle frame component 80 is a chain stay of the bicycle frame and is also oppositely separated into two third shells 80A, 80B toward the upper side and the lower side in FIG. 9. The two third shells 80A, 80B are capable of being symmetrically assembled together as well.

In the third embodiment, each one of the shells 60A, 60B, 70A, 70B, 80A, 80B has two connecting margins 61, 71, 81 configured to be symmetrically assembled. The connecting margins 61, 71, 81 facilitate the first shells 60A, 60B, the second shells 70A, 70B, and the third shells 80A, 80B to be heated, compressed, and fused together. With reference to FIG. 10, the connecting margins 61 of the first shells 60A, 60B are heated, are compressed, and are fused to turn into a fusion area 62. Assemble the first bicycle frame component 60, the second bicycle frame component 70, and the third bicycle frame component 80 to complete the bicycle frame composed of the first bicycle frame component 60, the second bicycle frame component 70, and the third bicycle frame component 80.

Figure 11:
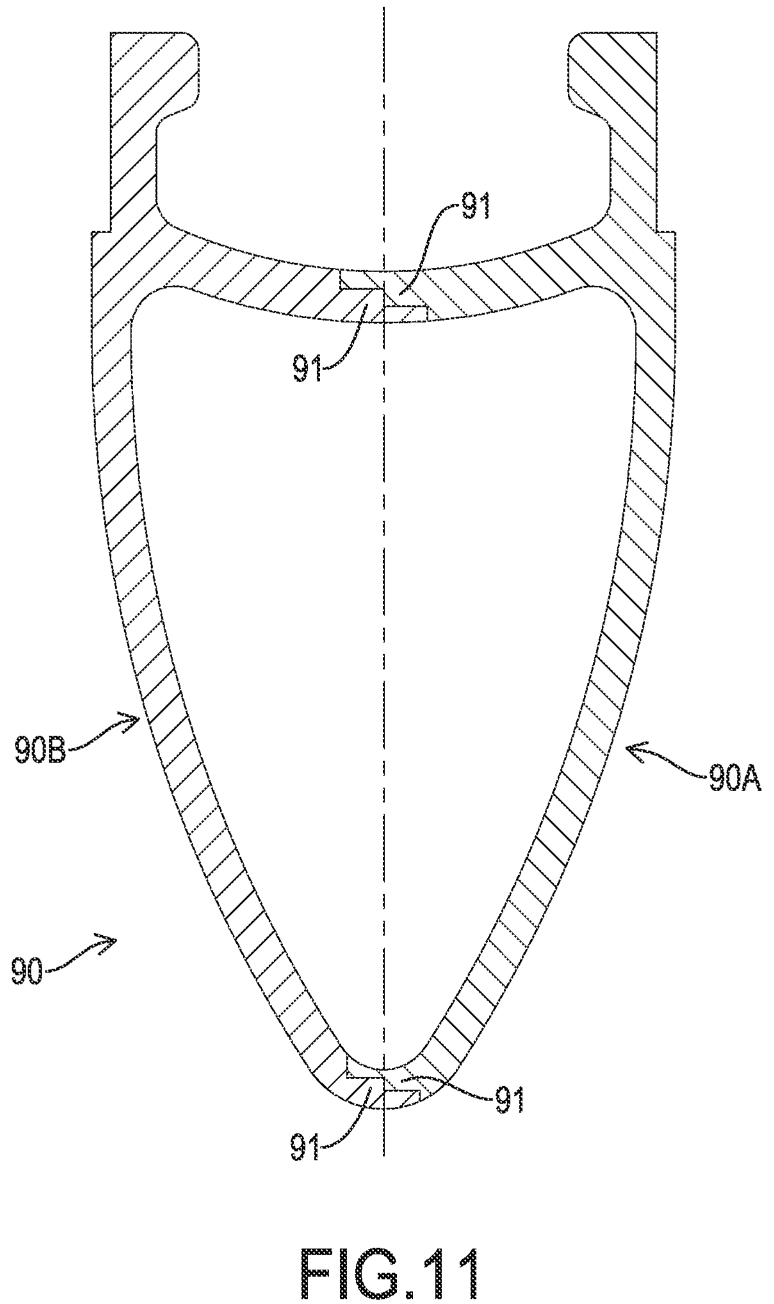
FIG. 11 is a cross sectional side view of a fifth embodiment of two fourth shells of a wheel rim of a bicycle frame component in accordance with the present invention.

In the third embodiment of the present invention, the method of the present invention is applied to manufacture a front fork of a bicycle. In the fourth embodiment of the present invention, the method of the present invention is applied to manufacture an entire bicycle frame. Therefore, the method of the present invention can be applied to any part of a bicycle frame that is hollow such as a wheel rim 90. A cross-sectional view of the wheel rim 90 is shown in FIG. 11, and the wheel rim 90 has two fourth shells 90A, 90B. Each one of the two fourth shells 90A, 90B has two connecting margins 91. The two fourth shells 90A, 90B are capable of being symmetrically assembled together as the third embodiment and the fourth embodiment.

A manufacturing method of a thermoplastic composite bicycle frame in accordance with the present invention mainly comprises a shell forming step, a shell assembling step, and a hot pressing step. The manufacturing method of the present invention is adapted to produce a substantially complete bicycle frame component, and a preferred embodiment thereof is shown in FIGS. 12 to 20.

Figure 12:
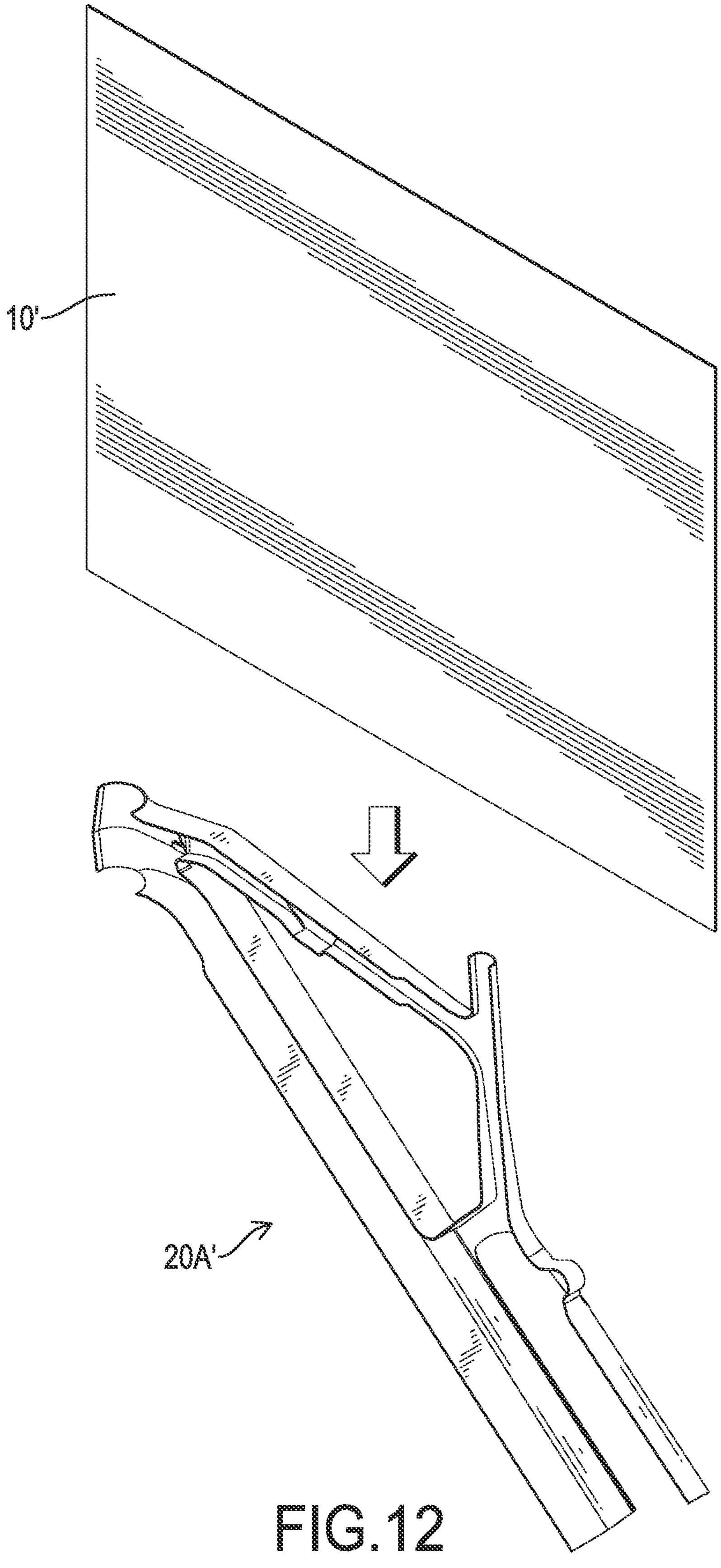
FIG. 12 illustrates a shell forming step of a preferred embodiment of a manufacturing method of a thermoplastic composite bicycle frame in accordance with the present invention.
Figure 13:
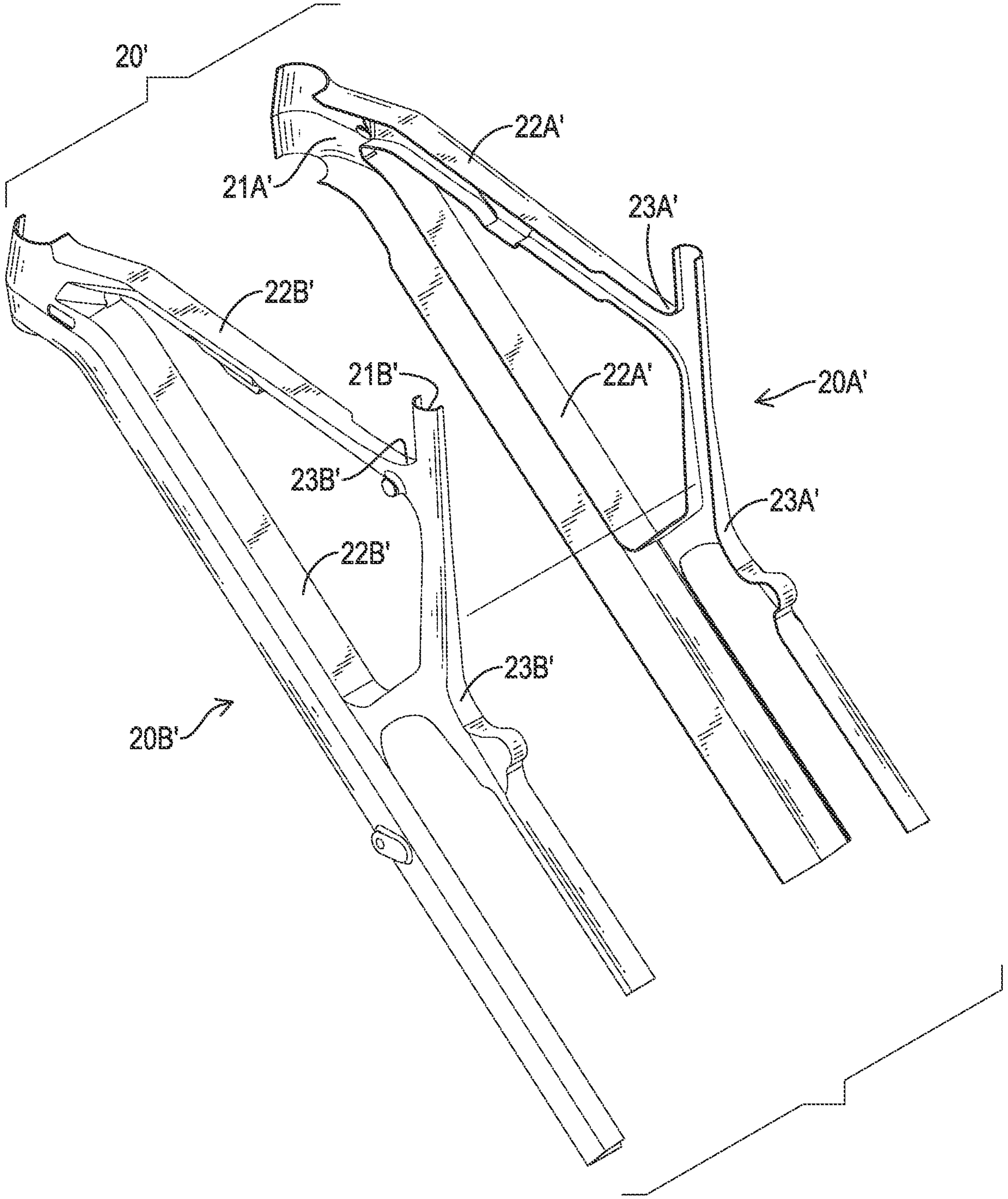
FIG. 13 is an exploded perspective view of two shells of the manufacturing method in FIG. 12.
Figure 14:
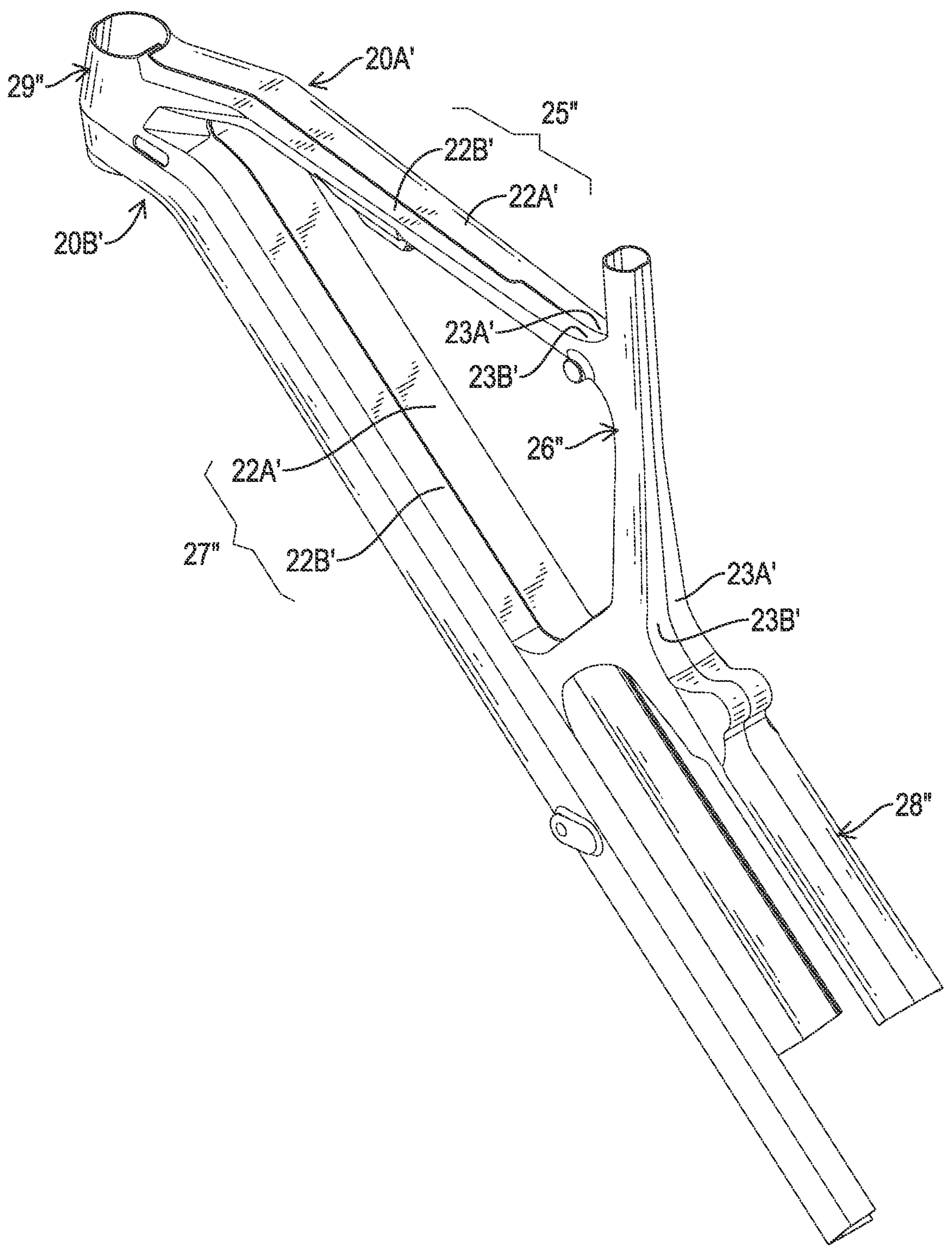
FIG. 14 is a perspective view of the two shells in FIG. 13 after a shell assembling step of the manufacturing method.

The shell forming step: With reference to FIGS. 12 to 13, the present invention separates a bicycle frame component 20' into two shells 20A', 20B' that are capable of being assembled together in a bilateral symmetry. In the shell forming step, thermoplastic composite laminates 10' are made of carbon fiber reinforced thermoplastic composite laminates or glass fiber reinforced thermoplastic composite laminates, and are turned into the shells 20A', 20B' by compression molding accompanied with appropriate trimming.

With reference to FIG. 13, each one of the shells 20A', 20B' comprises a cavity 21A', 21B' surrounded by the shell 20A', 20B', at least one straight segment 22A', 22B' and at least one curved segment 23A', 23B' connected with said straight segment 22A', 22B'. The straight segments 22A', 22B' of the two shells 20A', 20B' are aligned with each other. The curved segments 23A', 23B' of the two shells 20A', 20B' are aligned with each other. In the preferred embodiment of the present invention, each one of the two shells 20A', 20B' has multiple said straight segments 22A', 22B' and multiple said curved segments 23A', 23B'.

For example, the straight segments 22A', 22B' are configured to be assembled as a top tube, a down tube of the bicycle frame component 20', and other substantially straight frame tubes. The curved segments are configured to be assembled as a connecting part of a head tube and the top tube, a connecting part of the head tube and the down tube, a connecting part of the top tube and a seat tube, a connecting part of the seat tube and a motor mount, and other curved portions formed at where the frame tubes are connected with each other.

Furthermore, with reference to FIGS. 15 to 18, each said straight segment 22A', 22B' has a straight connecting edge 221A', 221B' which is used for connecting the shells 20A', 20B'. Each said curved segment 23A', 23B' has a curved connecting edge 231A', 231B' which is used for connecting the shells 20A', 20B'.

The shell assembling step: with reference to FIGS. 13 to 15 and 18, assembling the two shells 20A', 20B' to make the straight connecting edges 221A', 221B' of the two shells 20A', 20B' overlapped with one another and to make the curved connecting edges 231A', 231B' of the two shells 20A', 20B' butt jointed, i.e. end sides of the curved connecting edges completely cover one another. Specifically, with reference to FIG. 16, in the preferred embodiment of the present invention, the two shells 20A', 20B' are assembled by inserting the straight connecting edges 221B' of the straight segments 22B' of one of the two shells 20B' into the cavity 21A' of the other shell 20A', and the straight connecting edges 221A', 221B' of the two shells 20A', 20B' thereby form an overlapping configuration. On the other hand, with reference to FIG. 17, the curved connecting edges 231A', 231B' of the two shells 20A', 20B' abut each other without extending into any one of the cavities 21A', 21B' of the two shells 20A', 20B', and form a butt joint configuration instead of an overlapping one.

With aforementioned operational steps, the two shells 20A', 20B' are assembled and form a prestructure of parts of a bicycle frame, including but not limited to a top tube portion 25", a seat tube portion 26", a down tube portion 27", a motor mount portion 28", and a head tube portion 29". After the following hot pressing, those parts are turned into the top tube, the seat tube, the down tube, the motor mount, and the head tube of the bicycle frame serially.

Figure 16:
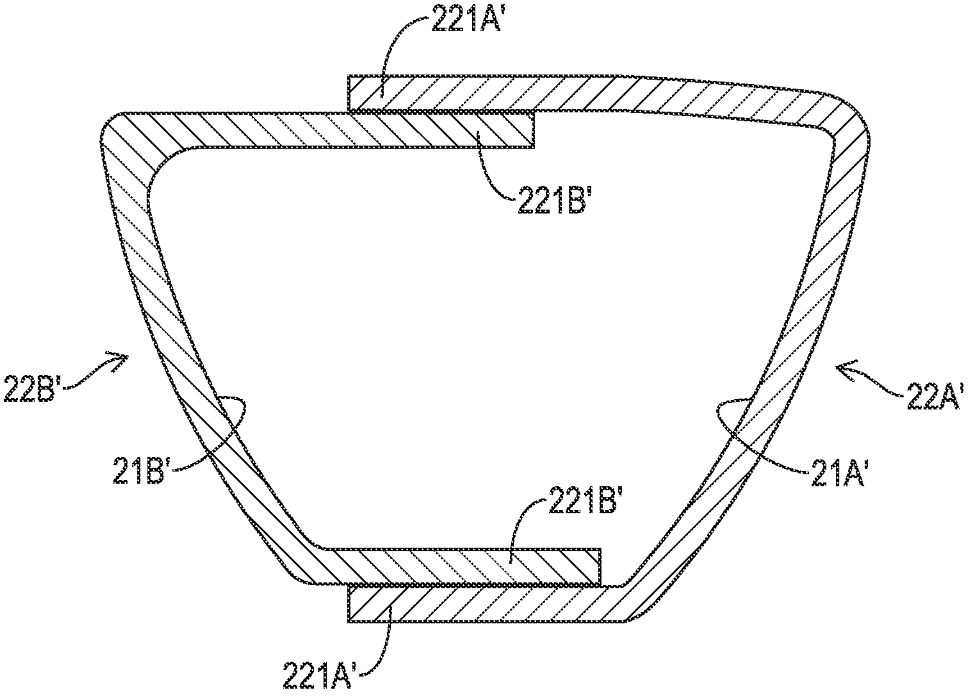
FIG. 16 is a cross-sectional side view along an A-A cutting line in FIG. 15.
Figure 17:
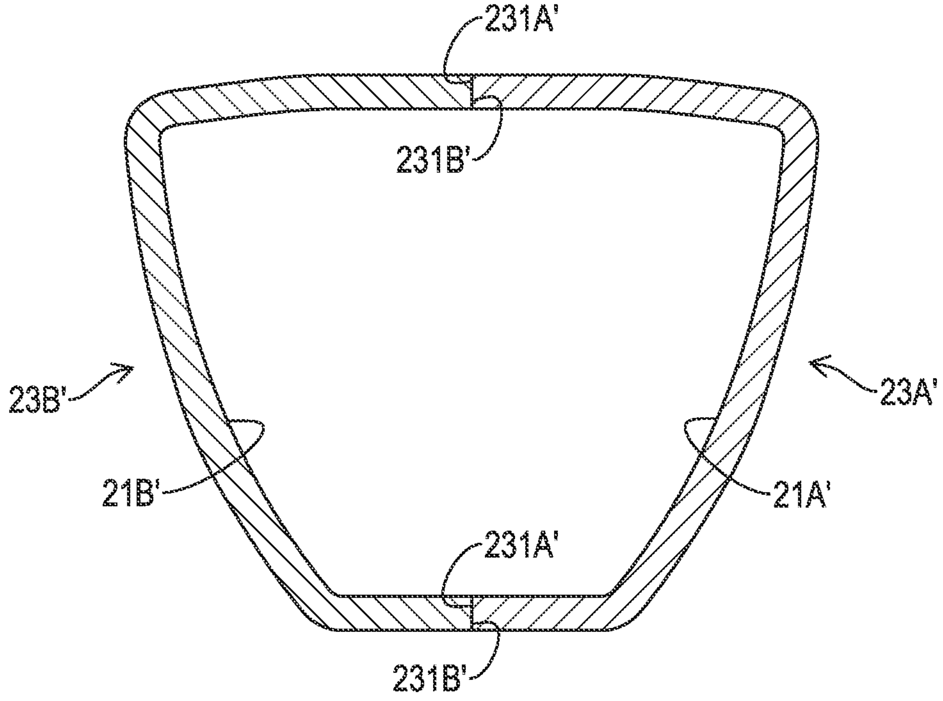
FIG. 17 is a cross-sectional side view along a B-B cutting line in FIG. 15.

In terms of the embodiment shown in the drawings, for enabling the straight connecting edges 221A', 221B' of the two shells 20A', 20B' to overlap, the end side of each one of the straight connecting edges 221A', 221B' oversteps a width of about 2.5 to 6 mm from a symmetric line of the bicycle frame component 20'. Thereby, when the two shells 20A', 20B' are overlapped, the corresponding straight connecting edges 221A', 221B' have an overlapping width of about 5 to 12 mm. With reference to FIG. 16, the overlapping width is about 8 mm.

In other embodiments, the bicycle frame component may be separated into three or more shells that are assemblable. As long as the technical features of the straight segments and the curved segments of the shells comply with the present invention, amount of the shells is not restricted by the present invention.

Figure 19:
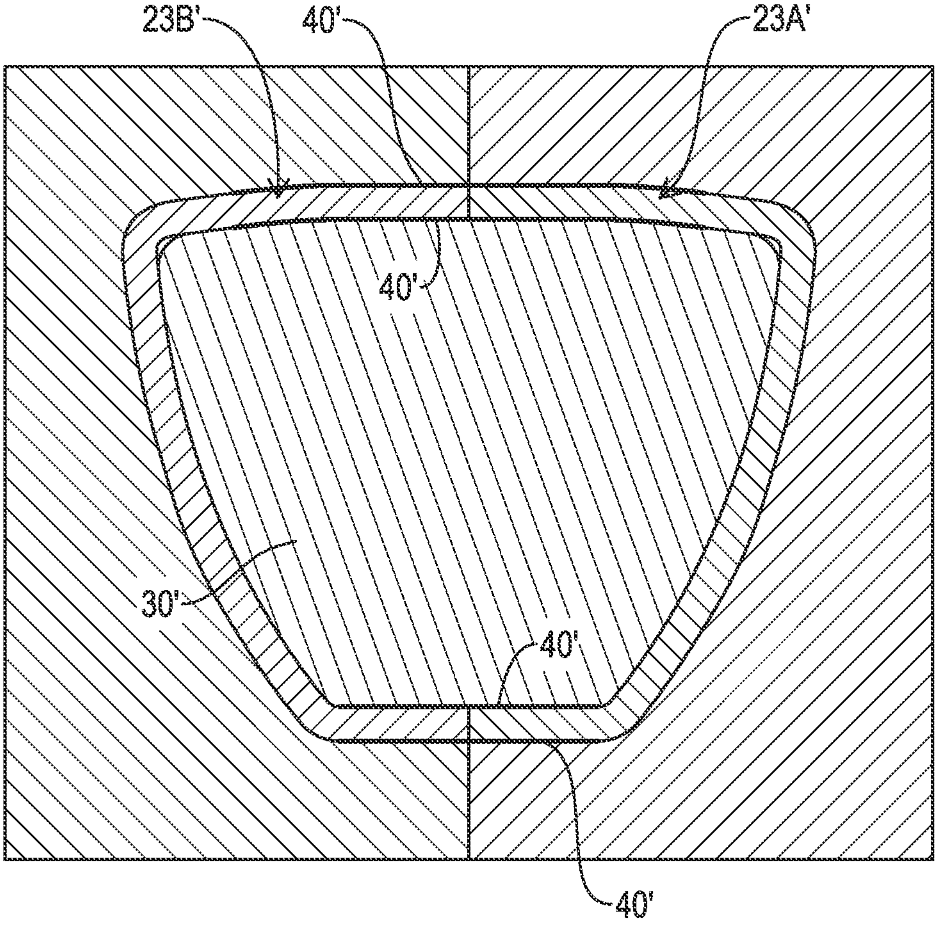
FIG. 19 illustrates a cross-sectional side view of a reinforcement step and a hot pressing step of the manufacturing method in FIG. 12.

The hot pressing step: with reference to FIG. 19, through compression molding, turning the overlapped straight connecting edges 221A', 221B' and the butt jointed curved connecting edges 231A', 231B' of the two shells 20A', 20B' into multiple fusion areas by heating and compressing so as to connect the shells 20A', 20B' as a bicycle frame component 20'.

Since stress concentration easily occurs at the curved segments 23A', 23B' of the thermoplastic composite bicycle frame during the forming processes, the butt joint configuration (rather than an overlapping configuration) of the curved connecting edges 231A', 231B' of the two shells 20A', 20B' effectively eliminates stress at curved parts of the bicycle frame, controls shapes of bicycle frame components at a low defect rate, and favors producing substantially complete bicycle frame component by saving mounting processes of multiple bicycle frame units.

Moreover, with reference to FIG. 19, the manufacturing method of the present invention, before the hot pressing step, disposing a supporting unit 30' within the two shells 20A', 20B' to support the shells 20A', 20B', and after the hot pressing step, removing the supporting unit 30' accompanied with trimming to finish the bicycle frame component 20'. The supporting unit 30' may be made of metal, foam, wax, or even an air bag for molding, etc. The form of the supporting unit 30 is not limited in the present invention.

Furthermore, in the preferred embodiment of the present invention, the manufacturing method comprises a reinforcement step: attaching reinforcement material 40' on at least one of an interior and an exterior of the butt jointed curved connecting edges 231A', 231B' of the two shells 20A', 20B'. Preferably, with reference to FIG. 19, said reinforcement material 40' is attached on both of the interior and the exterior of the curved connecting edges 231A', 231B'. And in the hot pressing step, the reinforcement material 40' is cured. Material and curing of said reinforcement material 40' are conventional knowledge and skills, so detailed description is omitted.

Thereby, in order to prevent damages of the bicycle frame component 20' from the weak curved segments 23A', 23B' (due to stress concentration), said reinforcement material 40' can be used to improve structural strength. If the curved connecting edges 231A', 231B' are overlapped, in the hot pressing step, the curved connecting edges 231A', 231B' form thicker fusion areas and form step differences, and then problems of mold clamping and wrinkling of the reinforcement material 40' may occur. Mold clamping means that the reinforcement material 40' is pinched by molds for hot pressing and forms outwardly protruding superfluous material. Wrinkling means that the reinforcement material 40' is forced to inwardly fold and forms inward superfluous material. Both mold clamping and wrinkling cause defects of products which need further processing to repair. The present invention makes the curved segments 23A', 23B' of the two shells 20A', 20B' butt jointed rather than overlapping, effectively avoiding mold clamping and wrinkling and favoring the reinforcement step.

Figure 15:
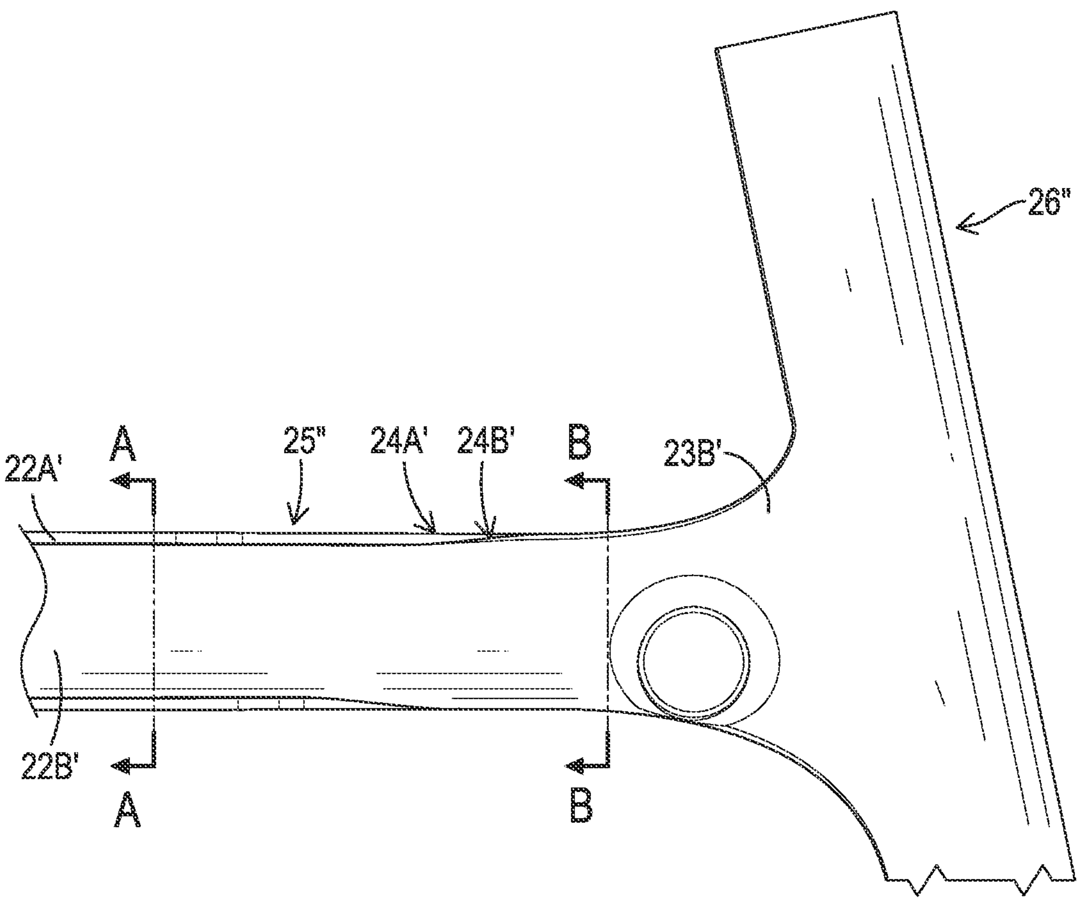
FIG. 15 is an enlarged side view of the assembled two shells in FIG. 14.
Figure 18:
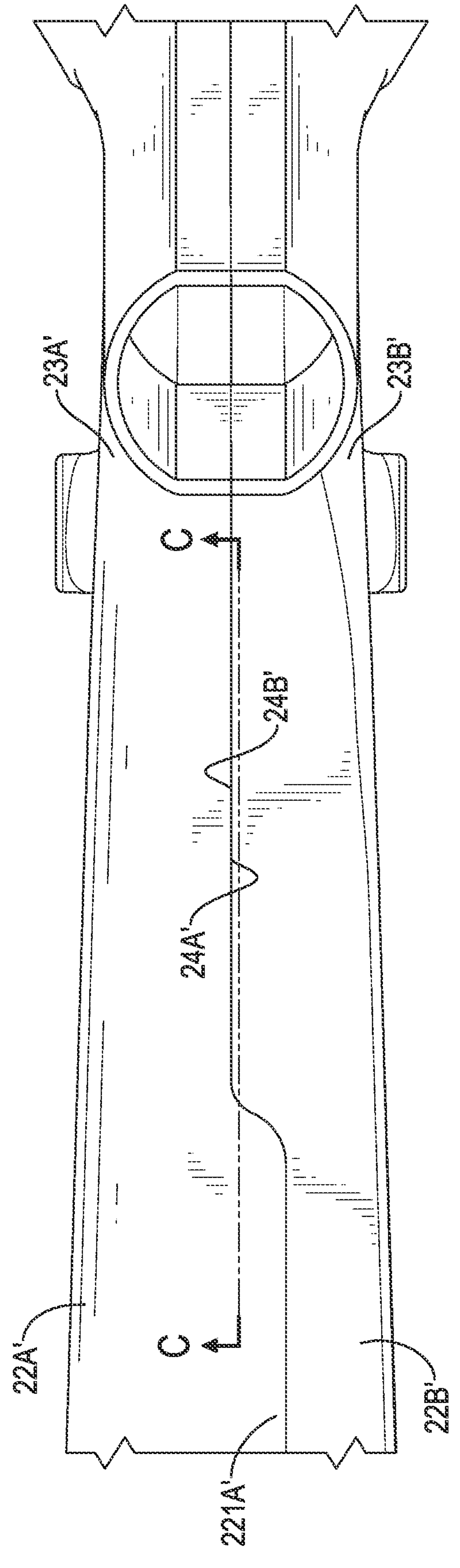
FIG. 18 is a top view of the bicycle frame part shown in FIG. 15.
Figure 20:
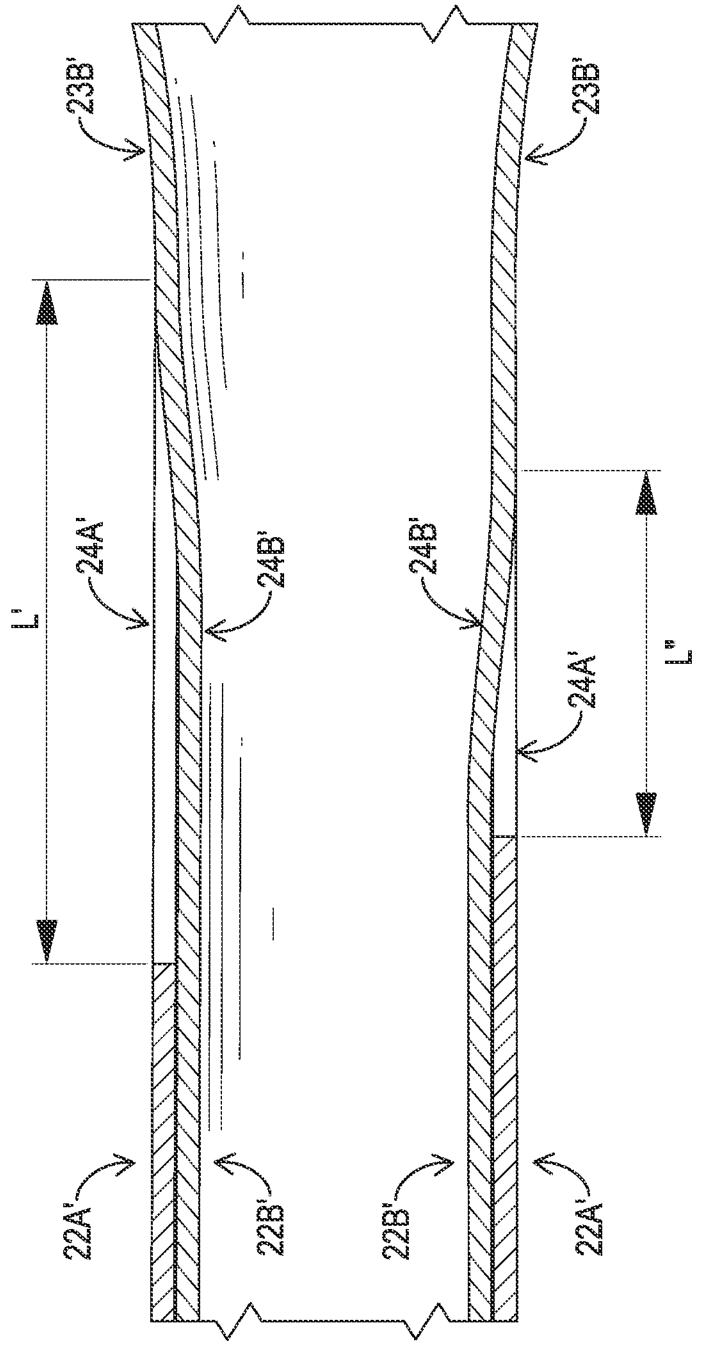
FIG. 20 is a cross-sectional side view along a C-C cutting line in FIG. 18.

Preferably, with reference to FIGS. 15, 18, and 20, in the shell forming step, forming a transitional segment 24A', 24B' between adjacent said straight connecting edge 221A', 221B' and said curved connecting edge 231A', 231B' on each one of the two shells 20A', 20B'. In the shell assembling step, with reference to FIG. 20, assembling the two shells 20A', 20B' to make said transitional segment 24A', 24B' of each one of the two shells 20A', 20B' partially abutted with said transitional segment 24A', 24B' of another said shell 20A', 20B', e.g. portions on the right end of said transitional segment 24A', 24B' in FIG. 20 are presented as non-complete covering of abutting end sides of the transitional segments 24A', 24B'. In addition, the transitional segments 24A', 24B' of the two shells 20A', 20B' are also partially mislaid as non-overlapping and non-abutting, e.g. portions on the left end of said transitional segment 24A', 24B' in FIG. 20. With reference to FIGS. 15, 18, and 20, the abutted part and the mislaid part of said transitional segments 24A', 24B' are arranged along an extending direction of the corresponding straight segments 22A', 22B'.

With reference to FIG. 20, a length L', L" of said transitional segment 24A', 24B' falls within 10 to 100 millimeters inclusively. In this way, said transitional segment 24A', 24B' is capable of effectively connecting the corresponding straight connecting edges 221A', 221B' and the corresponding curved connecting edges 231A', 231B' to save the latter from mutual interfering. Thereby feasibility of the manufacturing method of a thermoplastic composite bicycle frame of the present invention is further improved. The length rage of said transitional segment 24A', 24B' also avoids positioning difficulties and weakening of structural strength. Preferably, the length L', L" of said transitional segment 24A', 24B' falls within 30 to 50 millimeters inclusively, so better efficacy may be expected. In the reinforcement step, covering said transitional segment 24A', 24B' with the reinforcement material 40'.

With the aforementioned technical features, the curved segments 23A', 23B' of the shells 20A', 20B' are butt jointed with each other via the curved connecting edges 231A', 231B', and the straight segments 22A', 22B' with lower requirements for stress relief and reinforcement are overlapped via the straight connecting edges 221A', 221B' to facilitate positioning of the two shells 20A', 20B' when assembling. The straight segments 22A', 22B' and the curved segments 23A', 23B' can jointly improve the quality of the bicycle frame component product by facilitating positioning, eliminating stress, and facilitating reinforcement respectively.

What is claimed is:

1. A manufacturing method of a thermoplastic composite bicycle frame comprising:

- a shell forming step: turning thermoplastic composite laminates into multiple separate shells by compression molding, wherein
  - the multiple shells are capable of being assembled together;
  - each one of the multiple shells has a cavity surrounded by the shell, at least one straight segment and at least one curved segment connected with the at least one straight segment;
  - the straight segments of the multiple shells are aligned with one another and configured to be assembled to one another as frame tubes of a bicycle frame component which are substantially straight;
  - the curved segments of the multiple shells are aligned with one another and configured to be assembled to one another as a connecting part of the frame tubes;
  - each straight segment has a straight connecting edge; and
  - each curved segment has a curved connecting edge;
- a shell assembling step: assembling the multiple shells to make the straight connecting edges of the multiple shells overlapped with one another and to make the curved connecting edges of the multiple shells butt jointed with one another rather than being overlapped; and
- a hot pressing step: through compression molding, turning the overlapped straight connecting edges and the butt jointed curved connecting edges of the multiple shells into multiple fusion areas by heating and compressing so as to connect the multiple shells as the bicycle frame component;

wherein in the shell forming step, forming a transitional segment between adjacent said straight connecting edge and said curved connecting edge on each one of the multiple shells; and in the shell assembling step, assembling the multiple shells to make said transitional segment of each one of the multiple shells partially abutted with and partially mislaid as non-overlapping and non-abutting with said transitional segment of another said shell, thereby dividing the transitional segment into an abutted part and a mislaid part, and the abutted part and the mislaid part of each said transitional segment are arranged along an extending direction of the corresponding straight segments.

2. The manufacturing method as claimed in claim 1, wherein in the shell forming step, the thermoplastic composite laminates are carbon fiber reinforced thermoplastic composite laminates or glass fiber reinforced thermoplastic composite laminates.

3. The manufacturing method as claimed in claim 1, wherein the manufacturing method comprises a reinforcement step: attaching reinforcement material on at least one of an interior and an exterior of the butt jointed curved connecting edges of the multiple shells, and in the hot pressing step, curing the reinforcement material.

4. The manufacturing method as claimed in claim 1, wherein

- the manufacturing method comprises a reinforcement step: attaching reinforcement material on at least one of an interior and an exterior of the butt jointing curved connecting edges of the multiple shells;
- the reinforcement material covers said transitional segment; and
- the manufacturing method, in the hot pressing step, curing the reinforcement material.

5. The manufacturing method as claimed in claim 1, wherein in the shell forming step, a length of said transitional segment falls within 10 to 100 millimeters inclusively.

6. The manufacturing method as claimed in claim 1, comprising: before the hot pressing step, disposing a supporting unit within the multiple shells to support the multiple shells, and after the hot pressing step, removing the supporting unit accompanied with trimming to finish the bicycle frame component.

7. The manufacturing method as claimed in claim 2, comprising: before the hot pressing step, disposing a supporting unit within the multiple shells to support the multiple shells, and after the hot pressing step, removing the supporting unit accompanied with trimming to finish the bicycle frame component.

8. The manufacturing method as claimed in claim 3, comprising: before the hot pressing step, disposing a supporting unit within the multiple shells to support the multiple shells, and after the hot pressing step, removing the supporting unit accompanied with trimming to finish the bicycle frame component.

9. The manufacturing method as claimed in claim 4, wherein the manufacturing method: before the hot pressing step, disposing a supporting unit within the multiple shells to support the multiple shells, and after the hot pressing step, removing the supporting unit accompanied with trimming to finish the bicycle frame component.

10. The manufacturing method as claimed in claim 5, comprising: before the hot pressing step, disposing a supporting unit within the multiple shells to support the multiple shells, and after the hot pressing step, removing the supporting unit accompanied with trimming to finish the bicycle frame component.

* * * * *